(12) United States Patent
Hauck et al.

(10) Patent No.: US 8,567,581 B2
(45) Date of Patent: Oct. 29, 2013

(54) END PLATE FOR A PLATE ASSEMBLY, FRICTIONALLY OPERATING DEVICE HAVING AN END PLATE OF THIS KIND, AND METHOD FOR THE PRODUCTION OF AN END PLATE OF THIS KIND

(75) Inventors: Hans Juergen Hauck, Schwaebisch Hall (DE); Thomas Scharmacher, Hockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 398 days.

(21) Appl. No.: 12/959,451

(22) Filed: Dec. 3, 2010

(65) Prior Publication Data
US 2011/0139567 A1 Jun. 16, 2011

(30) Foreign Application Priority Data
Dec. 12, 2009 (DE) .................. 10 2009 058 129

(51) Int. Cl.
*F16D 13/64* (2006.01)
*B21D 5/16* (2006.01)
(52) U.S. Cl.
USPC ... 192/48.91; 72/379.2; 192/48.8; 192/70.11; 192/107 R
(58) Field of Classification Search
USPC ....... 192/70.2, 85.43; 74/449; 72/48; 470/41, 470/42; 403/DIG. 7
See application file for complete search history.

(56) References Cited

U.S. PATENT DOCUMENTS

| | | | |
|---|---|---|---|
| 6,474,128 B1 * | 11/2002 | Liu ............................. | 72/379.2 |
| 7,063,197 B2 * | 6/2006 | Merkel et al. .............. | 192/85.43 |
| 2005/0067251 A1 * | 3/2005 | Braford et al. ............. | 192/70.12 |

FOREIGN PATENT DOCUMENTS

| | | |
|---|---|---|
| DE | 60222266 T2 | 5/2008 |
| JP | 5-32144 A * | 12/1993 |

* cited by examiner

*Primary Examiner* — Rodney Bonck
(74) *Attorney, Agent, or Firm* — BrooksGroup

(57) ABSTRACT

One embodiment includes an annular end plate for a plate assembly of a frictionally operating device, having a friction section, extending in the radial direction, to form a flat front side, which can be turned toward the plate assembly in a first axial direction, and having a rotary driving section, which integrally adjoins the friction section in the first radial direction. The end plate may have a reinforcing section, which integrally adjoins the friction section in the opposite, second, radial direction, the reinforcing section or the first section of the reinforcing section, that adjoining the friction section, being at least partially and preferably completely bent through more than 90° in the opposite, second, axial direction relative to the friction section. The present invention furthermore relates to a frictionally operating device having an end plate of this kind and to a method for the production of an end plate of this kind.

15 Claims, 11 Drawing Sheets

Figure 15:
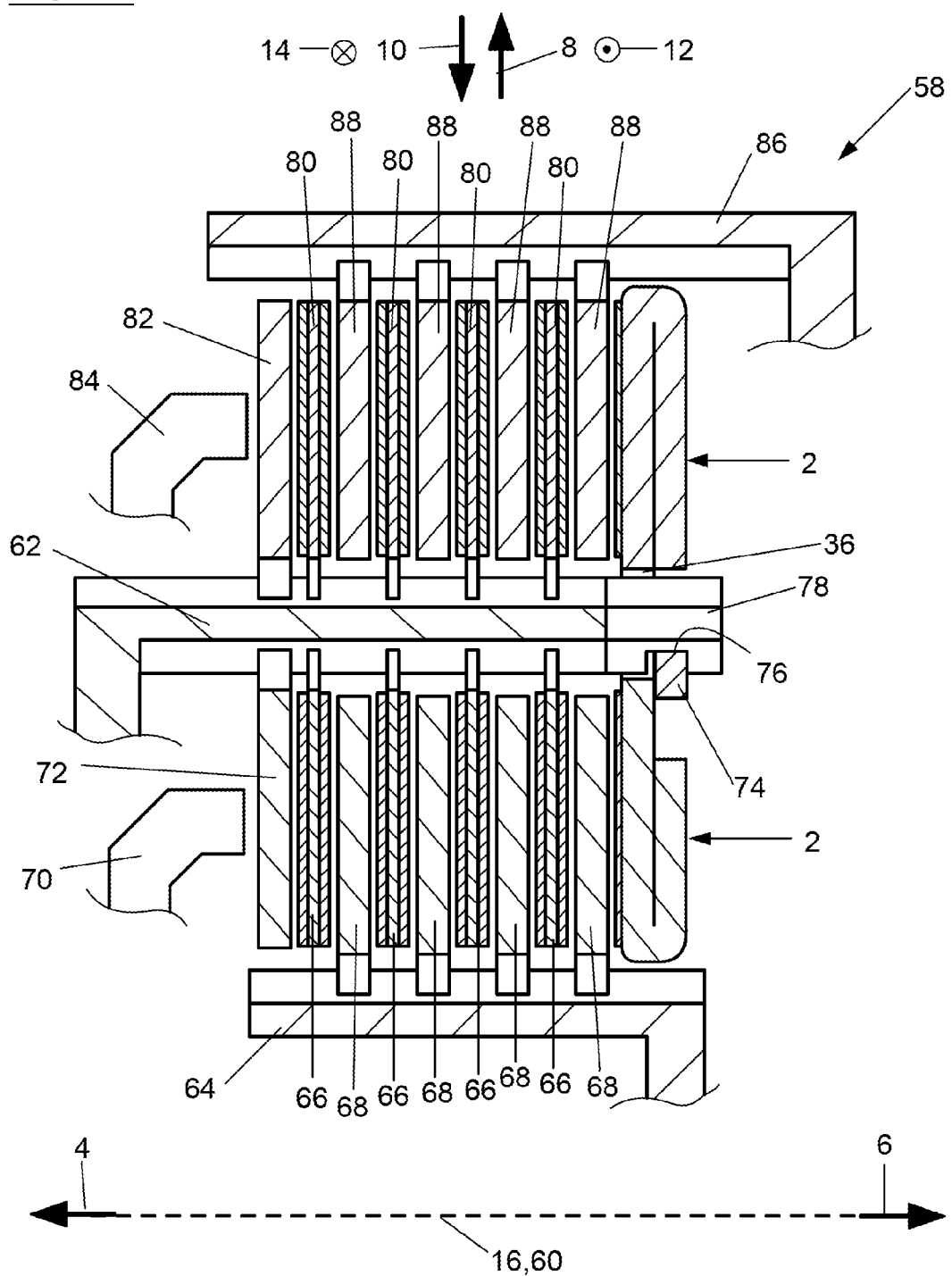

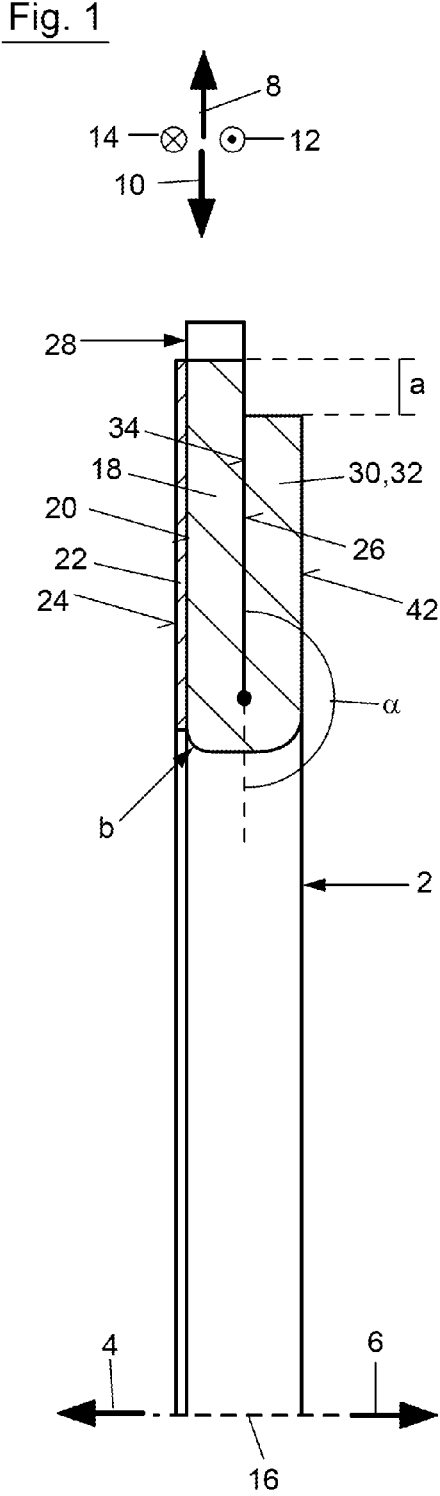
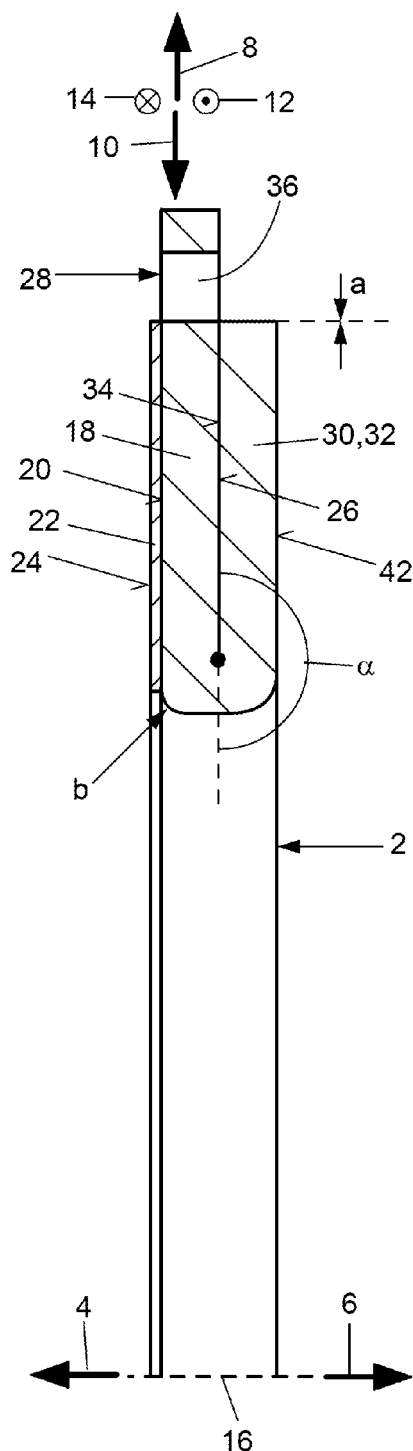

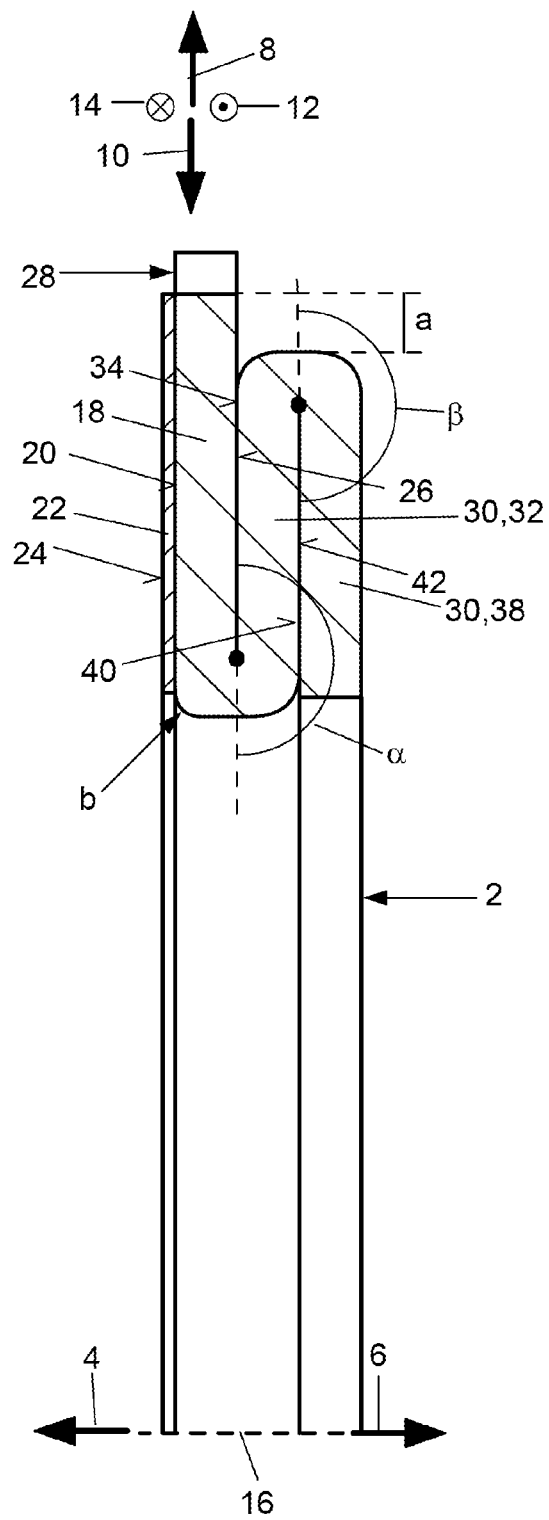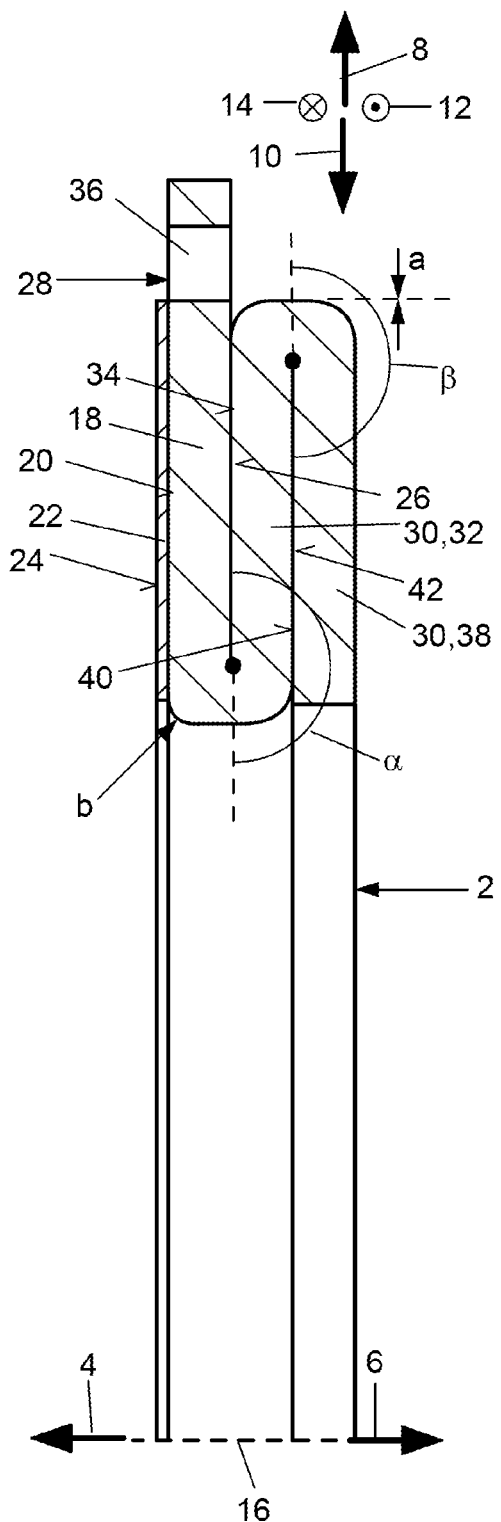

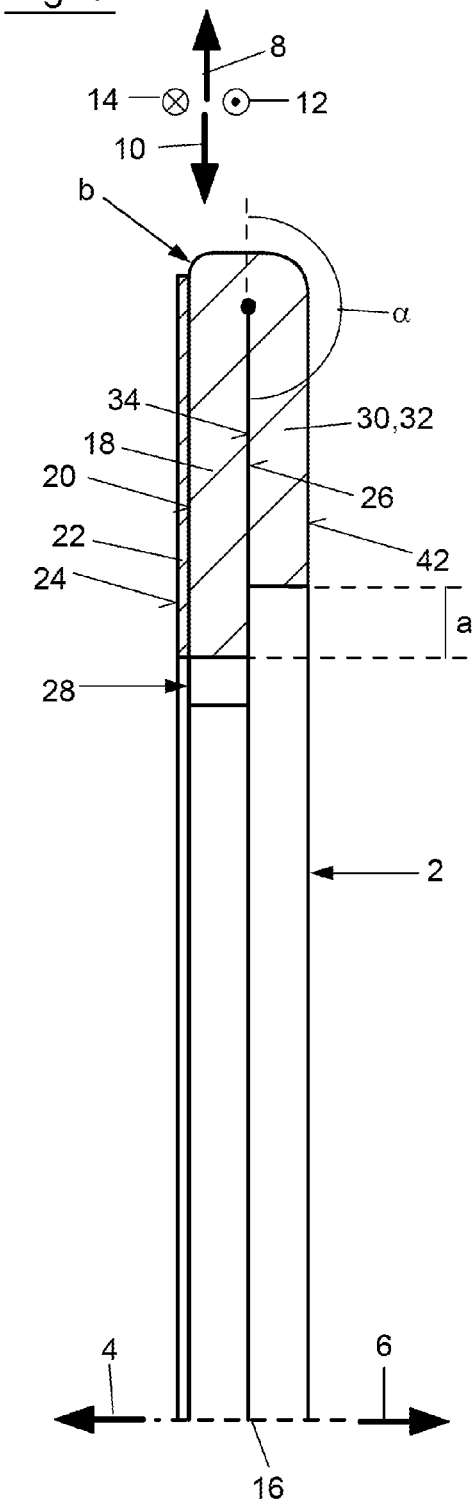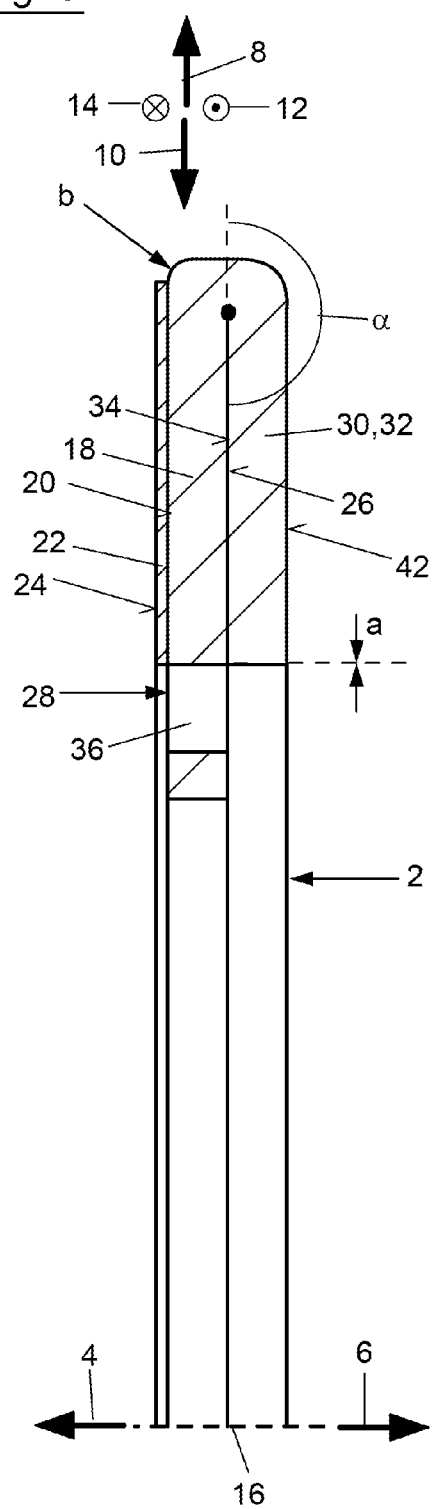

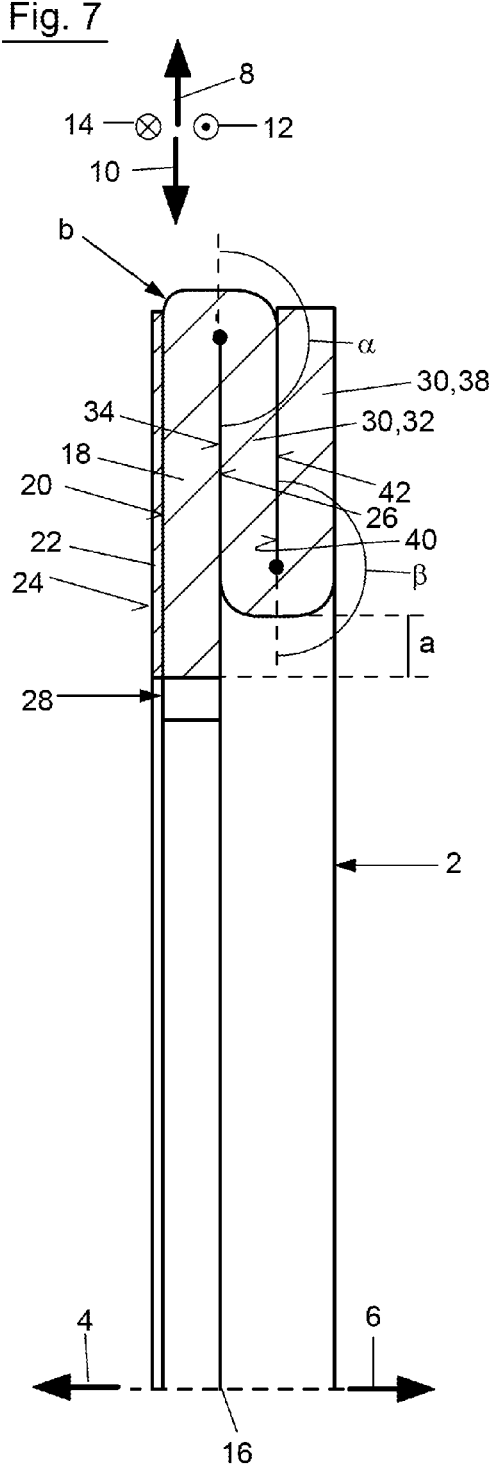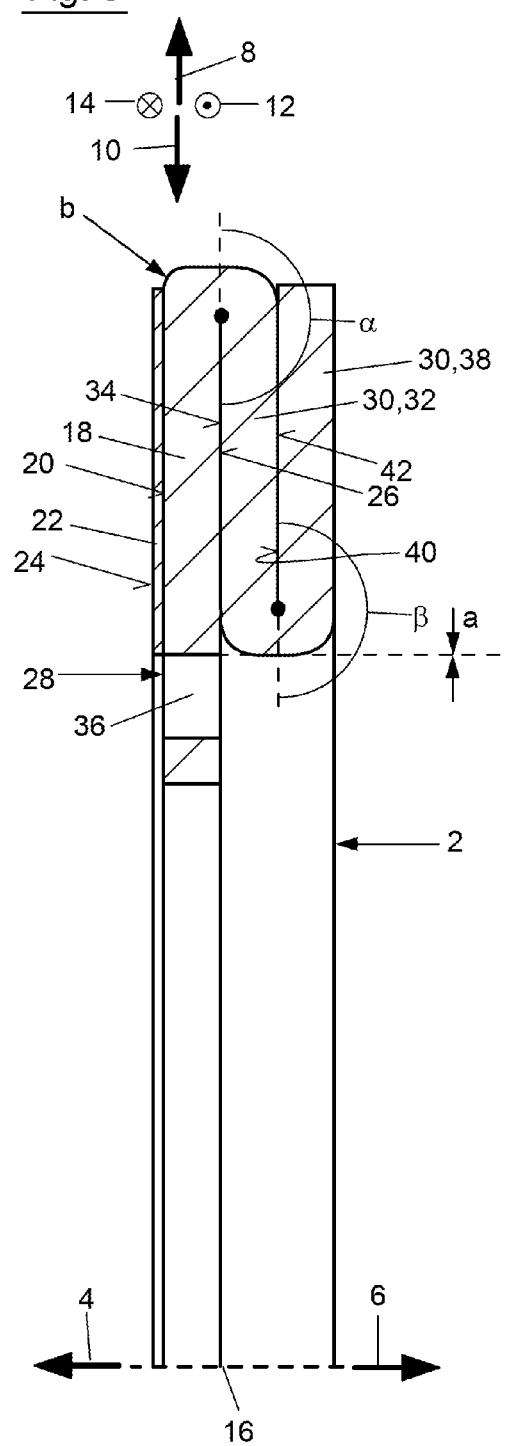

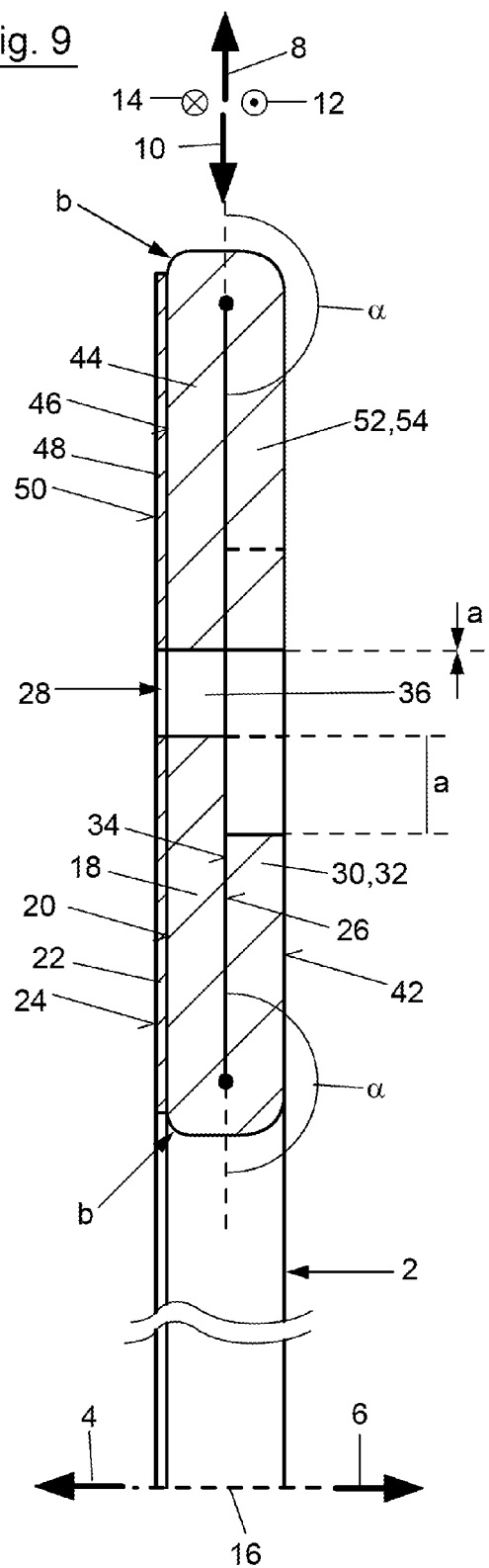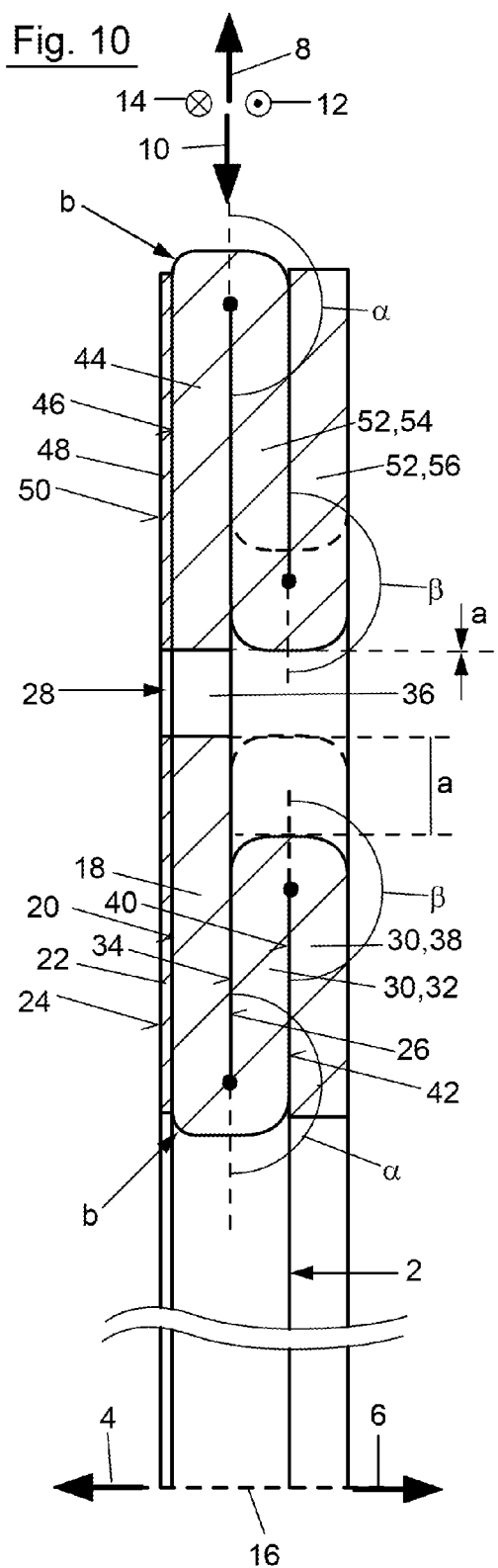

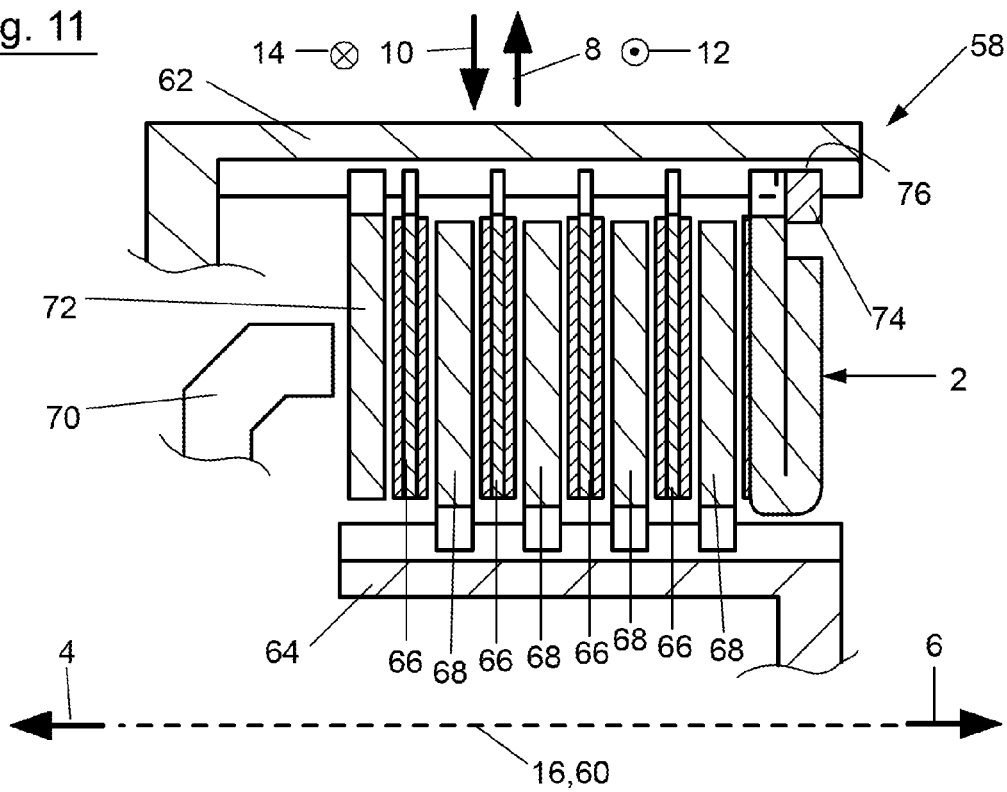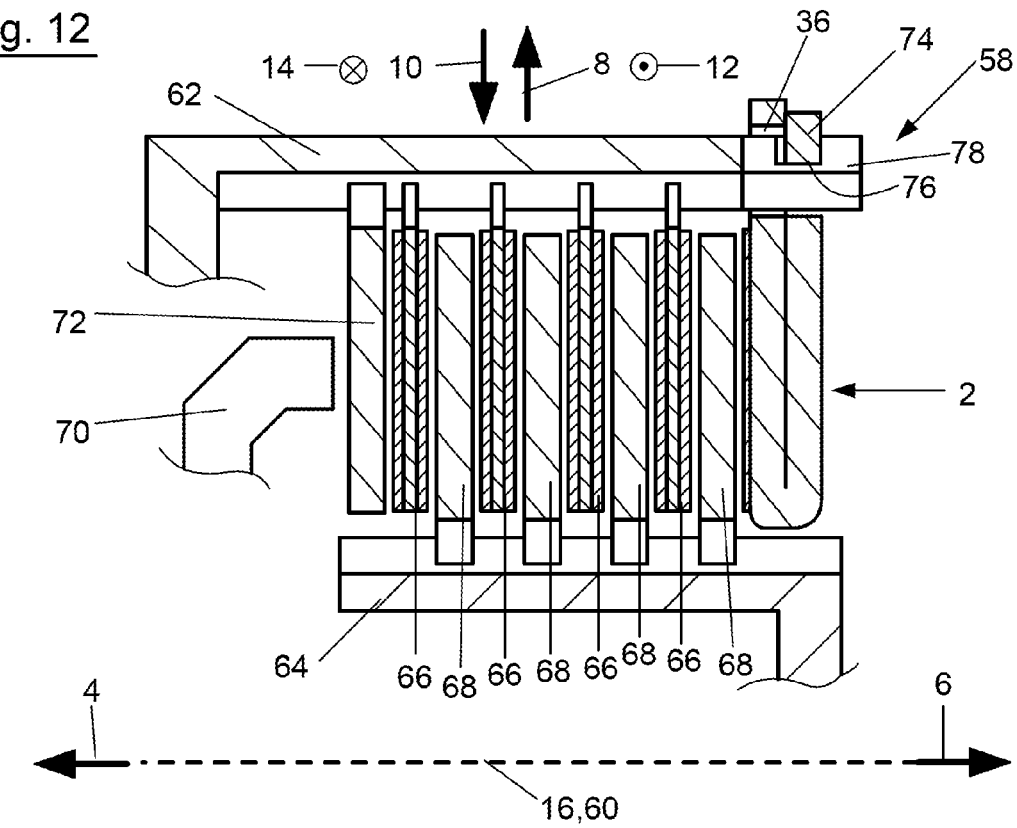

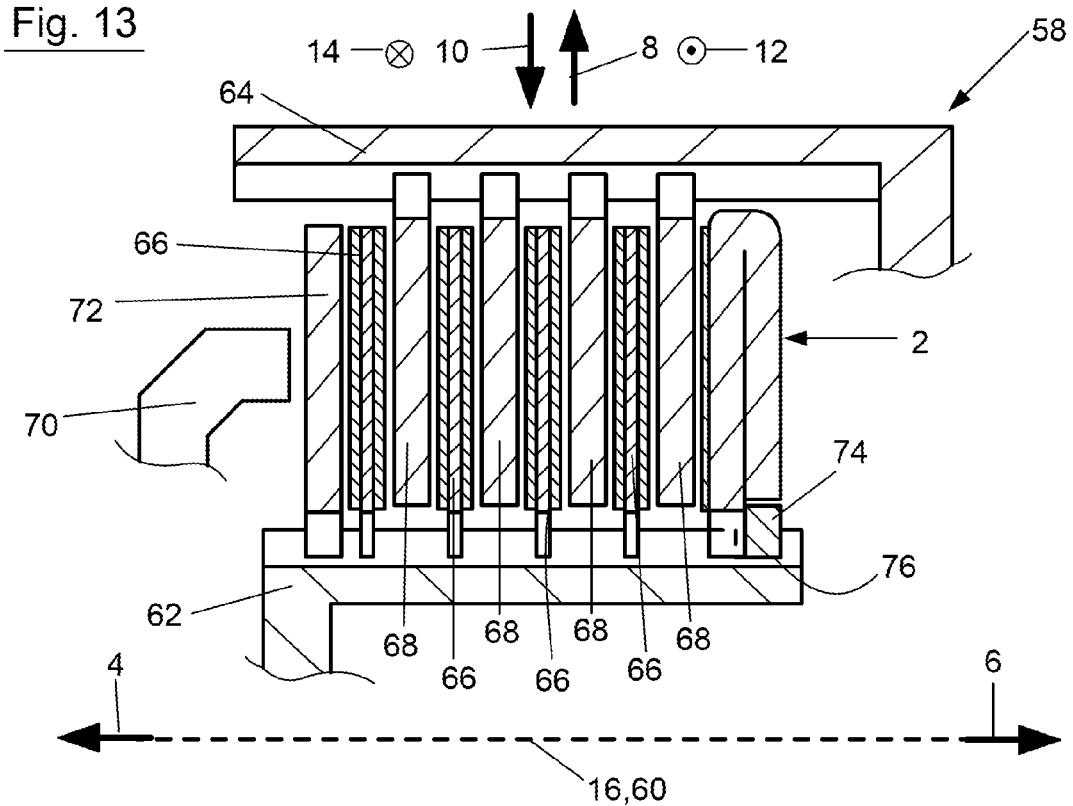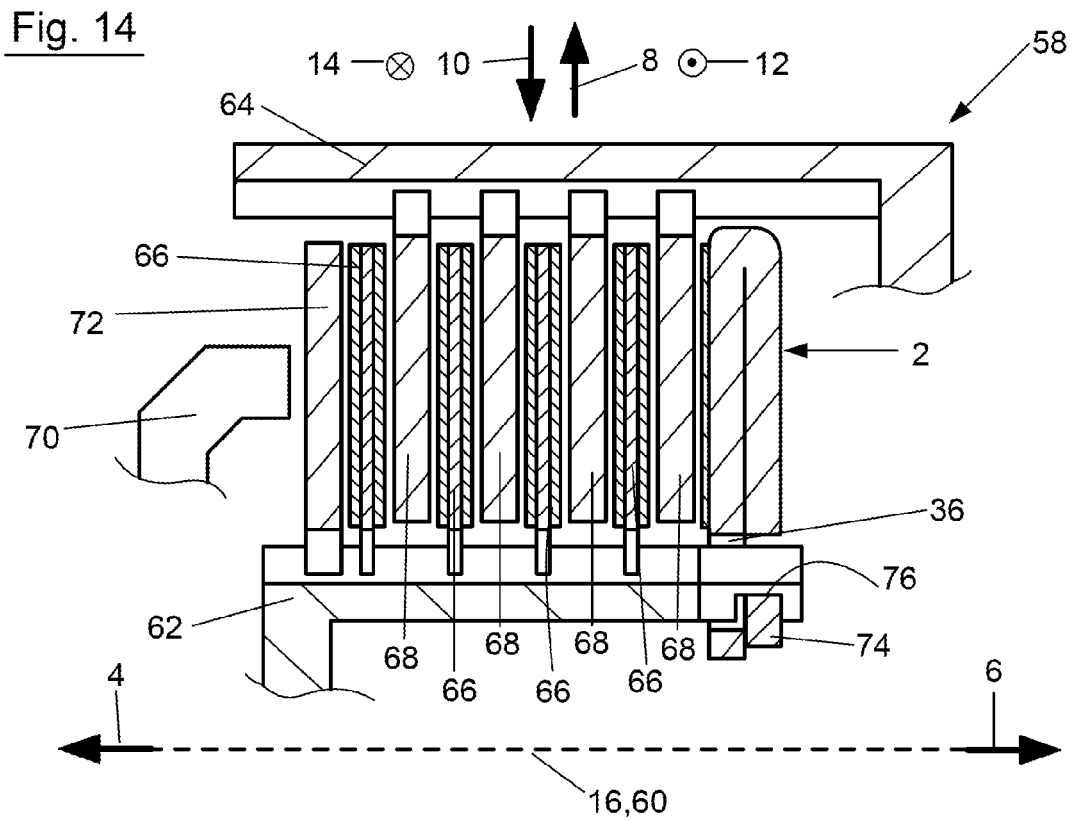

END PLATE FOR A PLATE ASSEMBLY, FRICTIONALLY OPERATING DEVICE HAVING AN END PLATE OF THIS KIND, AND METHOD FOR THE PRODUCTION OF AN END PLATE OF THIS KIND

This application claims the benefit of German Application Serial No. 10 2009 058129.4 filed Dec. 12, 2009.

FIELD

The field relates to an annular end plate for a plate assembly of a frictionally operating device, having a friction section, extending in the radial direction, to form a flat front side, which can be turned toward the plate assembly in a first axial direction, and having a rotary driving section, which integrally adjoins the friction section in the first radial direction, and a frictionally operating device having an end plate of this kind and to a method for the production of an end plate of this kind.

BACKGROUND

Frictionally operating devices, in particular multiplate clutches, which have a plate assembly which can be pressed together by means of an actuating piston, are known from the prior art. An end plate, which is often also referred to as a support plate or end disk, is associated with the plate assembly on the opposite side from that on which the force is introduced. The end plate is in rotary driving connection with one of the plate carriers of the frictionally operating device via a rotary driving section, and furthermore the end plate is or can be supported against the associated plate carrier in at least one axial direction by means of a retaining ring or the like. By virtue of this support for the end plate against the associated plate carrier, it is possible for the plate assembly to be pressed together, thereby producing torque transmission between the plate carriers. By virtue of this support and of the actuating force applied, however, the end plate is exposed to high bending loads in the axial direction, and the end plate must therefore have a particularly high bending rigidity in the axial direction.

In order to avoid bending of the end plate in the axial direction, use has been made in the past of solid end plates, and these have a correspondingly great thickness to increase bending rigidity in the axial direction. Moreover, a circumferential groove has been provided in the region of the rotary driving section of the solid end plate, this groove being intended to simplify the arrangement of the retaining ring in the region of the rotary driving section and thus also reduce the overall axial length of the plate carrier, a groove of this kind having been produced by a machining process or a forging process, for example. The known solid end plates have proven their worth in as much as their bending rigidity in the axial direction is increased. However, with solid end plates there is the disadvantage that they have a particularly high weight and, furthermore, the production of the solid end plate is made more difficult.

Patent DE 602 22 266 T2 discloses a two-piece end plate with a lower weight. On the one hand, the two-piece end plate is made up of a core plate in the form of an annular disk, intended to form a flat front side, which can be turned toward the plate assembly, and, on the other hand, of a separate support housing, the latter being intended to support the core plate on its side facing away from the plate assembly in order to increase the bending rigidity of the two-piece end plate in the axial direction. Here, the support housing is constructed substantially in the manner of a plate but, in contrast to the core plate, has a profile which is suitable for increasing the bending rigidity of the two-piece end plate in the axial direction, while it has been possible to significantly reduce the weight of the two-piece end plate in comparison with the abovementioned solid end plate. DE 602 22 266 T2 furthermore proposes to provide both the core plate and the support housing with a rotary driving section, thus enabling both to be connected in a torsionally rigid manner to the same plate carrier. As an alternative embodiment, it is furthermore proposed to set up a direct connection between the core plate and the support housing via suitable fixing means on the appropriate surfaces of the core plate and of the support housing in order to prevent relative rotation between the core plate and the support housing during operation. However, irrespective of the respective embodiment variant, there is the disadvantage with the two-piece end plate consisting of a core plate and a support housing that the production thereof can only be accomplished with an increased outlay.

DESCRIPTION

One embodiment includes an end plate for a plate assembly of a frictionally operating device which, on the one hand, has a high bending rigidity in the axial direction and, where applicable, a relatively low weight and, on the other hand, is particularly simple to produce. Another embodiment is a frictionally operating device which has an advantageous end plate of this kind. In addition, the present invention is based on the object of specifying an advantageous method for the production of the end plate according to the invention.

The end plate may be designed for a plate assembly of a frictionally operating device and is of annular construction. Relative to the cross section of the end plate, said end plate has a friction section, extending in the radial direction, to form a flat front side, which can be turned toward the plate assembly in a first axial direction. In this arrangement, the flat front side preferably lies in a plane, the normal of which is formed by the axis of rotation of the annular end plate. Moreover, the flat front side is preferably in the form of an annular surface. The front side of the friction section can thus form the friction surface of the end plate during the use of the latter, or can receive a friction facing to form the friction surface. Integrally adjoining the friction section in the first radial direction of the annular end plate—relative to the cross section—is a rotary driving section, the rotary driving section making it possible to establish a rotary driving connection between the end plate and a plate carrier of the frictionally operating device. The rotary driving section can, for example, be designed as an external or internal tooth system or even as a section with a plurality of apertures, into which axially projecting fingers of the plate carrier can be inserted to produce a rotary driving connection. The end plate furthermore has a reinforcing section, which integrally adjoins the friction section in the opposite, second, radial direction, i.e. in the radial direction opposite to the first radial direction. The reinforcing section, which is formed integrally with the friction section, or the first section of the reinforcing section, that adjoining the friction section, is at least partially bent through more than 90° in the opposite, second, axial direction, i.e. in the axial direction opposite to the first axial direction, relative to the friction section.

The end plate according to the invention is particularly simple to produce. While, in the case of the two-piece end plate known from DE 602 22 266 T2, a core plate and a support housing are first of all manufactured separately from one another and then connected directly to one another at the surfaces of the core plate and the support housing by way of suitable fixing means, this working step of directly connecting the friction section and the reinforcing section is eliminated with the end plate, in particular because the end plate according to the invention is produced by bending from the friction section and the reinforcing section, which are connected integrally to one another from the outset. Moreover, it has been found that the integral structure of the friction section and the reinforcing section from the outset makes it possible to achieve the same or even better bending rigidity in the axial direction as/than is the case with a two-piece end plate, in which the components, which are initially separate from one another, such as a core plate and a support housing, are subsequently connected by way of suitable fixing means, such as adhesive, welding material or the like. The effect of bending the reinforcing section or the first section of the reinforcing section, that adjoining the friction section, at least partially through more than 90° in the opposite, second, axial direction relative to the friction section is not only to increase the bending rigidity of the end plate in the axial direction but also to ensure that the reinforcing section and the end plate are relatively short both in the radial direction and in the axial direction, allowing the end plate to be used without problems even when there is little installation space available in said directions. Moreover, bending the reinforcing section or first section through more than 90° in relation to the friction section has the advantage that the friction section and hence the front side thereof can have a particularly large extent in the radial direction, thus enabling the front side itself or a friction section secured on the front side to form a friction surface which can be brought into frictional engagement over a large area with the friction surface of a mating plate of the other plate set.

In order to obtain an end plate which is particularly short both in the radial and in the axial direction and has a relatively high bending rigidity in the axial direction, the reinforcing section or the first section of the reinforcing section, that adjoining the friction section, is bent completely through more than 90° in the second axial direction relative to the friction section in a preferred embodiment of the end plate according to the invention.

To further reduce the overall axial length of the end plate the reinforcing section or the first section thereof is at least partially and preferably completely bent through at least 135°, particularly preferably through at least 180°, relative to the friction section in another embodiment of the end plate.

In another embodiment of the end plate, the reinforcing section or the first section thereof is bent in such a way that the reinforcing section or the first section is supported against the rear side of the friction section, said rear side facing away from the front side. This likewise encompasses the possibility that a section of the reinforcing section which follows on from the first section of the reinforcing section can also be supported against the rear side of the friction section, said rear side facing away from the front side. It has been found that supporting the reinforcing section or a section thereof against the rear side of the friction section has a positive effect on the bending rigidity of the end plate in the axial direction. Thus, for example, it would be conceivable for the free end of the reinforcing section to be supported against the rear side of the friction section. However, it has been found to be particularly advantageous if the reinforcing section or a section thereof is supported areally against the rear side of the friction section, as is the case in a preferred embodiment variant of the present embodiment. Thus, it would be possible in this embodiment variant for the front or rear side of the reinforcing section, for example, rather than the free end of the reinforcing section, to be supported against the rear side of the friction section. In another embodiment, the reinforcing section or the first section extends parallel to the friction section in the radial direction. In this context, it has proven advantageous for bending rigidity if one side of the reinforcing section extending parallel to the friction section is supported completely, in an areal manner, against the rear side of the friction section. Moreover, the parallel arrangement of the reinforcing section relative to the friction section and its areal support against the rear side of the friction section ensure that the end plate is particularly short in the axial direction, as is the case, for example, with the solid end plates mentioned at the outset, while a similar bending rigidity to that of solid end plates is achieved, even though the outlay on production is significantly lower.

In order to further increase the bending rigidity of the end plate in the axial direction, the reinforcing section in another embodiment the end plate has a second section, which integrally adjoins the first section and is at least partially and preferably completely bent in the second axial direction relative to the first section. In this embodiment too, it is preferred if the second section is supported against that side of the first section which faces away from the friction section in order to exert a positive effect on the bending rigidity in the axial direction, and, in this case too, it is particularly preferred that support for the second section against that side of the first section which faces away from the friction section should be areal in order to obtain a particularly high bending rigidity. It is furthermore preferred in this embodiment if the second section extends parallel to the first section in the radial direction. This makes it possible to achieve a small overall axial length of the end plate, and the overall axial length is particularly small if the second section extending parallel to the first section in the radial direction is supported completely, in an areal manner, against that side of the first section which faces away from the friction section.

In another embodiment of the end plate the reinforcing section is bent in such a way that it projects neither in the first nor in the second radial direction beyond the friction section. It would also be possible to speak of the reinforcing section being completely covered by the friction section, as seen in the axial direction. This embodiment is advantageous in as much as the extent of the end plate in the radial direction is essentially determined by the radial extent of the friction section, thus allowing the flat front side forming the friction surface or carrying the friction facing to have a particularly large extent in the radial direction, thereby making it possible to achieve optimum frictional engagement between the end plate, on the one hand, and the adjacent mating plate, on the other hand The reinforcing section may have an additional rotary driving section serving together with the first rotary driving section to establish a rotary driving connection with the associated plate carrier. However, the effect of this would be that the end plate would have a large axial extent in the area in which it is or can be supported against the plate carrier via a retaining ring or the like, and the plate carrier would therefore also need to have a large overall axial length to be able to securely accommodate the retaining ring or some other retaining element. In order to achieve a small overall axial length of the plate carrier, the reinforcing section in a further particularly preferred embodiment of the end plate according to the invention therefore has no rotary driving section. Moreover, this further simplifies the production of the end plate, especially as one working step for the production of a further rotary driving section is eliminated. In order to prevent the reinforcing section being supported in the radial direction against the plate carrier or in the axial direction against the retaining ring in this embodiment, the distance in the radial direction between the reinforcing section and the rotary driving section adjoining the friction section is preferably at least 0 mm, particularly preferably more than 0 mm. The first-mentioned alternative is suitable when the retaining ring for axial support of the end plate is arranged on that side of the plate carrier which faces away from the friction section and the reinforcing section, with a distance of 0 mm furthermore ensuring particularly high bending rigidity in the axial direction. The second alternative mentioned, in which the distance in the radial direction between the reinforcing section and the rotary driving section adjoining the friction section is more than 0 mm, is necessary or advantageous when the retaining ring is arranged on that side of the associated plate carrier which faces the friction section and the reinforcing section, especially as this ensures that the end plate is supported against the retaining ring in the axial direction exclusively via the rotary driving section, not via the reinforcing section. To ensure this, the abovementioned distance must be matched to the dimensioning of the retaining ring and to the dimensioning of the groove accommodating the retaining ring within the plate carrier. If the retaining ring is designed as an external retaining ring, which is arranged on the outside of the plate carrier, it is furthermore particularly preferred if the supporting section or a section thereof acts as a centrifugal force safeguard for the retaining ring, i.e. the supporting section or a section thereof should be shaped and dimensioned in such a way that a retaining ring expanding under the action of centrifugal force can be supported in a radially outward direction against the supporting section or a section thereof before the retaining ring is lifted completely out of the associated groove within the plate carrier.

In another embodiment of the end plate, the end plate is designed as a steel plate. This means that no additional friction facing is arranged on the end plate; on the contrary, the flat front side of the friction section of the end plate, which can be turned toward the plate assembly in the first axial direction, is used as a friction surface which can be brought into frictional engagement with the friction surface of the mating plate of the other plate set. As an alternative, the end plate in this embodiment is designed as a friction-faced plate with a friction facing arranged on the front side of the friction section. This friction facing is preferably an organic friction facing, particularly preferably a paper friction facing. The friction facing is furthermore preferably adhesively bonded to the front side of the friction section and has a substantially annular form.

Frictionally operating devices which have two or more plate assemblies are known from the prior art, and so-called dual clutches may be mentioned here, in particular. In order to reduce the number of components and hence the outlay on assembly in the case of frictionally operating devices of this kind, the end plate may have a second friction section, which integrally adjoins the rotary driving section in the first radial direction and extends in the radial direction, to form a second front side, which can be turned toward a second plate assembly in the first axial direction, and has a second reinforcing section, which integrally adjoins the second friction section in the first radial direction, the second reinforcing section or the first section of the second reinforcing section, that adjoining the second friction section, being at least partially and preferably completely bent through more than 90° in the second axial direction relative to the second friction section. Instead of two separate end plates, just one end plate is thus used here, said end plate providing support for both the first plate assembly and the second plate assembly in the axial direction, but only one retaining ring is required to support the dual-function end plate axially against the associated plate carrier. To achieve the advantages mentioned, the above statements relating to the first friction section and the first reinforcing section shall preferably apply mutatis mutandis to the second friction section and the second reinforcing section. Moreover, the rotary driving section may have between the two friction sections, a multiplicity of circumferentially distributed apertures into which axially projecting rotary driving fingers of the associated plate carrier can extend in order to achieve a rotary driving connection between the plate carrier and the dual-function end plate.

To ensure that the flat front side of the friction section has a particularly large extent in the radial direction, thus ensuring that the friction surface formed by the front side itself or by the friction facing arranged on the front side is particularly large, the end plate makes provision for a bending radius to be formed at the transition between the front side of the friction section and the reinforcing section, said bending radius being no more than 1.0 mm, preferably no more than 0.8 mm and particularly preferably no more than 0.6 mm. In this way, it is possible to create a particularly large friction surface, which ensures reliable frictional engagement with the mating plate of the other plate set of the plate assembly.

In one embodiment, the frictionally operating device may be a multiplate clutch or multi-unit multiplate clutch, which may be a wet multiplate clutch or multi-unit multiplate clutch, has a plate assembly. The plate assembly may be made up of a first plate set, which may be connected in a torsionally rigid manner to a first plate carrier, and a second plate set, which is connected in a torsionally rigid manner to a second plate carrier. The plates of the two plate sets are arranged alternately in series in the axial direction and can be brought into frictional engagement with one another by pressing the plates together in the axial direction by means of an axially displaceable actuating piston, for example. The first plate set furthermore comprises an end plate, which is or can be supported against the first plate carrier in the second axial direction. Here, support in the axial direction is preferably provided against the first plate carrier by means of a retaining ring, the retaining ring particularly preferably being designed as a retaining ring situated radially on the inside in order to avoid expansion of the retaining ring under the action of centrifugal force during the operation of the frictionally operating device. The end plate may be formed by an end plate of the type which is described above. The term "end plate" in the context of the frictionally operating device should be taken to mean the end plate of the plate assembly which is arranged on the opposite side of the plate assembly from the area in which force is introduced. The end plate used makes possible particularly reliable support for the plate assembly against the first plate carrier in the second axial direction, and for details of the further advantages of the frictionally operating device.

In another embodiment of the device, the front side or, where applicable, the friction facing of the end plate of the first plate set can be brought directly into frictional engagement with the adjacent plate of the second plate set. In this embodiment, there is thus no plate of the first plate set arranged in the axial direction between the end plate of the first plate set and the adjacent plate of the second plate set, and the end plate of the first plate set can therefore be brought directly into frictional engagement with the adjacent plate of the second plate set.

One embodiment includes a second plate assembly comprising a third plate set, which is connected in a torsionally rigid manner to the first plate carrier, and a fourth plate set, which is connected in a torsionally rigid manner to a third plate carrier, are furthermore provided, the plates of the third and fourth plate sets being arranged alternately in series in the axial direction and being capable of being brought into frictional engagement with one another. The end plate connected to the first plate carrier of the fast plate set furthermore forms the end plate of the third plate set, with recourse preferably being had here to the dual-function end plate described above.

In another embodiment the end plate forms both the end plate of the first plate set and the end plate of the third plate set, the second front side or, where applicable, the second friction facing of the end plate of the third plate set can be brought directly into frictional engagement with the adjacent plate of the fourth plate set. In this case too, there is no intervening plate belonging to the third plate set, and therefore direct frictional engagement is possible.

In another embodiment in which the dual-function end plate is used, the first plate carrier has axially projecting rotary driving fingers, which extend into the apertures in the rotary driving section of the end plate in order to produce a rotary driving connection between the first plate carrier and the dual-function end plate.

One embodiment includes a method for the production of an end plate of the type according to the invention has the method steps described in detail below. Thus, a one-piece and flat annular disk having a friction section and a reinforcing section situated radially on the inside or on the outside is first of all provided. The reinforcing section is then bent in an axial direction in such a way that it is bent through more than 90°, preferably at least 135°, particularly preferably at least 180°, relative to the friction section.

Another embodiment includes the method step of bending the reinforcing section furthermore includes the method steps described in detail below. Thus, first of all, the reinforcing section is bent in such a way that it is bent through 90° relative to the friction section. During this process, the reinforcing section accordingly acquires a substantially tubular form, while the friction section continues to be in the shape of an annular disk. The bending of the reinforcing section is preferably accomplished by deep drawing. The bending radius at the transition between the front side of the friction section, which faces away from the reinforcing section, and the reinforcing section, which is bent through 90° relative to the friction section, is then reduced, the reduction of said bending radius preferably being carried out without machining, particularly preferably by counternecking. The reinforcing section, which has been bent through 90° relative to the friction section, is then bent or widened in such a way that it is bent through more than 90°, at least 135° or at least 180°, relative to the friction section. The bending or widening of the friction section is preferably carried out in such a way that the reinforcing section is supported at least partially against the rear side of the friction section, this support preferably being provided areally. As an alternative, however, the support of the reinforcing section against the rear side of the friction section can also be achieved only in the course of the further method step described below.

Thus, in another embodiment of the method the bent or widened reinforcing section is then stamped or pressed together with the friction section in the axial direction, this process of stamping or pressing preferably being carried out in such a way that the reinforcing section is at least partially supported against the rear side of the friction section, particularly preferably in an areal manner.

In another embodiment of the method, the method step of finish-machining the front side of the friction section, thereby increasing the flatness of the front side, is furthermore provided, the finish-machining preferably being accomplished by grinding, particularly preferably by belt grinding. In addition, further finish-machining steps, such as the sizing of the inside or outside diameter, are advantageous.

According to an embodiment of the method, a rotary driving section is furthermore produced on the friction section in a further method step, preferably by punching. The rotary driving section may be formed only after the bending and pressing of the reinforcing section.

In a further embodiment of the method according to the invention, a friction facing is furthermore applied to the front side of the friction section, the friction facing may be a paper friction facing, and may be adhesively bonded onto the front side of the friction section.

DRAWINGS

Figure 16:
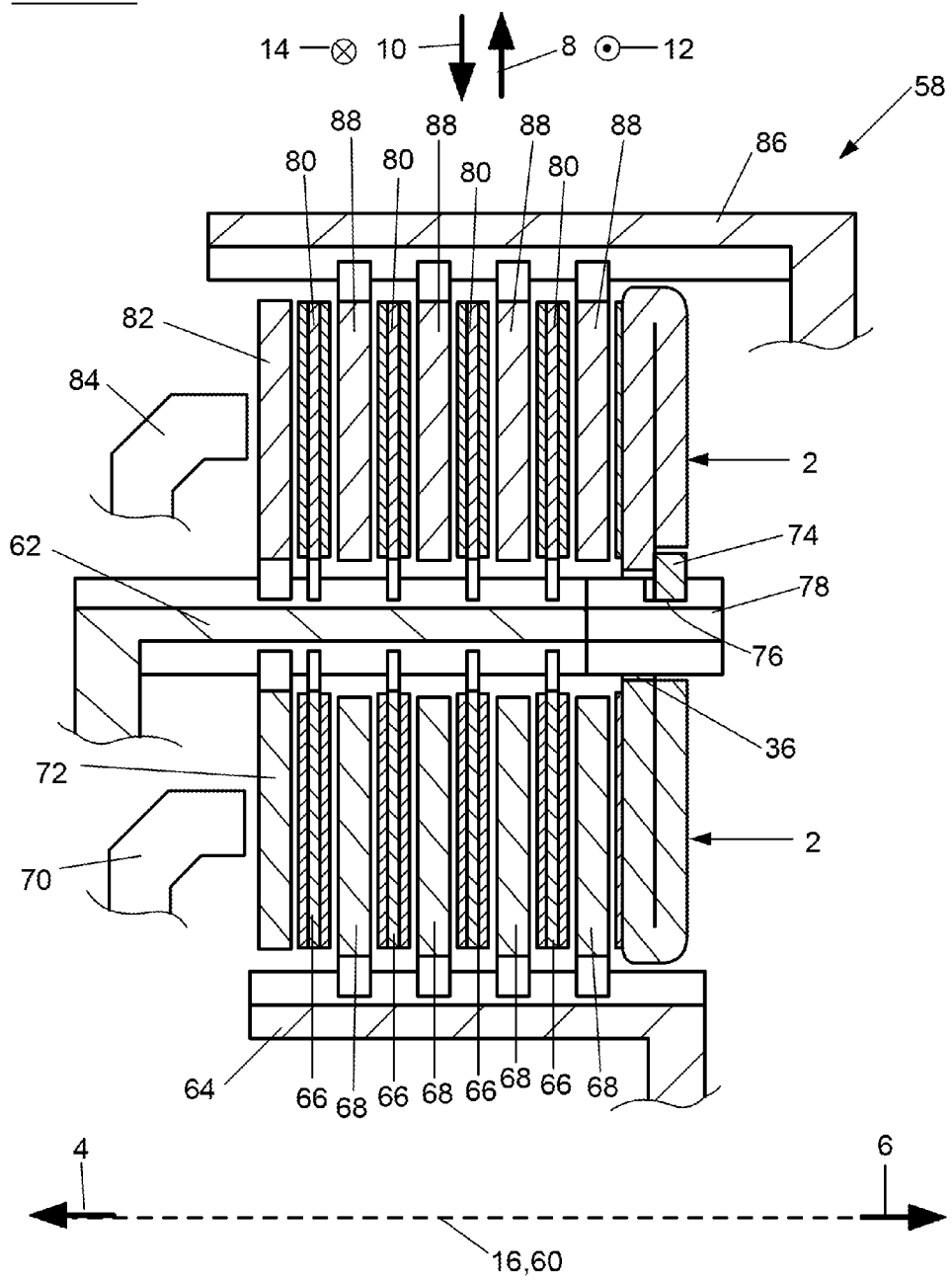

FIG. 1 shows a partial side view of a first embodiment of the end plate in sectioned representation, FIG. 2 shows a partial side view of a second embodiment of the end plate in sectioned representation, FIG. 3 shows a partial side view of a third embodiment of the end plate in sectioned representation, FIG. 4 shows a partial side view of a fourth embodiment of the end plate in sectioned representation, FIG. 5 shows a partial side view of a fifth embodiment of the end plate in sectioned representation, FIG. 6 shows a partial side view of a sixth embodiment of the end plate in sectioned representation, FIG. 7 shows a partial side view of a seventh embodiment of the end plate in sectioned representation, FIG. 8 shows a partial side view of an eighth embodiment of the end plate in sectioned representation, FIG. 9 shows a partial side view of a ninth embodiment of the end plate in sectioned representation, FIG. 10 shows a partial side view of a tenth embodiment of the end plate in sectioned representation, FIG. 11 shows a partial side view of a first embodiment of the multiplate clutch in sectioned representation, with the end plate of FIG. 1, FIG. 12 shows a partial side view of a second embodiment of the multiplate clutch in sectioned representation, with the end plate of FIG. 2, FIG. 13 shows a partial side view of a third embodiment of the multiplate clutch in sectioned representation, with the end plate of FIG. 5, FIG. 14 shows a partial side view of a fourth embodiment of the multiplate clutch in sectioned representation, with the end plate of FIG. 6, FIG. 15 shows a partial side view of a fifth embodiment of the multiplate clutch in sectioned representation, with the end plate of FIG. 9, FIG. 16 shows a partial side view of a sixth embodiment of the multiplate clutch in sectioned representation, with the end plate of FIG. 9, and FIGS. 17 to 22 show side views of the end plate of FIG. 1 in sectioned representation to illustrate an embodiment of the method for the production of the end plate according to FIG. 1.

FIG. 1 shows a first embodiment of the end plate 2 according to the invention. The end plate 2 is of annular design, and its mutually opposite axial directions 4, 6, its mutually opposite radial directions 8, 10 and its mutually opposite circumferential directions 12, 14 are indicated by corresponding arrows. The axis of rotation 16 of the annular end plate 2, which extends in axial direction 4, 6, is indicated by a dashed line.

In relation to the cross section, the end plate 2 has a friction section 18 which extends in the radial direction 8, 10. The friction section 18 is provided with a flat front side 20, which lies in a plane generated by the radial directions 8, 10, and the axis of rotation 16 extending in axial direction 4, 6 likewise represents the surface normal of this plane. In this context, the front side 20 is that side of the friction section 18 which faces the plate assembly of the frictionally operating device in the installed condition of the end plate 2. The end plate 2 shown can be designed either as a steel plate, on which the flat front side 20 forms the friction surface thereof, or as a friction-faced plate, as shown in FIG. 1. Thus, the end plate 2 in FIG. 1, which is designed as a friction-faced plate, is provided with a friction facing 22, which is secured on the front side 20 of the friction section 18 and has a friction surface 24 facing in axial direction 4. Moreover, the friction section 18 has a rear side 26, which faces away from the front side 20 and faces in axial direction 6.

A rotary driving section 28 integrally adjoins the friction section 18 in radial direction 8. The rotary driving section 28 serves to establish a rotary driving connection with a plate carrier assigned to the end plate 2, which will be described in greater detail below. In the present example, the rotary driving section 28 is an external tooth system, which can be brought into rotary driving engagement with the internal tooth system on an outer plate carrier, and the end plate 2 is consequently an outer plate. Consequently, the rotary driving section 28 itself is preferably configured in such a way that movement of the end plate 2 in axial direction 4, 6 relative to the plate carrier is possible in principle.

Integrally adjoining the friction section 18 in the opposite radial direction 10 is a reinforcing section 30, with the reinforcing section 30 in the embodiment illustrated being formed by just one, first, section 32, which directly adjoins the friction section 18. As can be seen from FIG. 1, the reinforcing section 30 or first section 32 thereof is at least partially and preferably completely bent at an angle α in axial direction 6 relative to the friction section 18. As regards the angle α, the rule is that this is greater than 90°. The angle α is preferably at least 135°, particularly preferably at least 180°.

In the embodiment shown, the reinforcing section 30 or first section 32 thereof is bent in such a way that a rear side 34 of the reinforcing section 30 or first section 32 faces in axial direction 4 and is supported in an areal manner against the rear side 26 of the friction section 18. Moreover, the reinforcing section 30 or first section 32 is bent relative to the friction section 18 in such a way that the reinforcing section 30 or first section 32 extends parallel to the friction section 18 in the radial direction 8, 10. In this specific embodiment, the entire rear side 34 of the reinforcing section 30 or first section 32 is supported against the rear side 26 of the friction section 18, something which, although not absolutely necessary, is advantageous as regards the overall axial length of the end plate 2.

The reinforcing section 30, which can in principle have not only the first section 32 but also further sections, which are bent, is bent in such a way that it does not project beyond the friction section 18 either in radial direction 8 nor in the opposite radial direction 10, as can be seen from FIG. 1. It is also possible to speak of the friction section 18 covering the reinforcing section 30 completely as seen in axial direction 6. This ensures that the radial extent of the cross section of the end plate 2 is essentially determined by the radial extent of the friction section 18 in the radial direction 8, 10, and it is thus also possible for the flat front side 20 to have a particularly large extent in the radial direction 8, 10.

In contrast to the friction section 18, the reinforcing section 30 is not adjoined by a rotary driving section, and the rotary driving connection between the end plate 2 and the associated plate carrier is effected exclusively via the rotary driving section 28 on the friction section 18. Moreover, the reinforcing section 30 is spaced apart in the radial direction 8, 10 from the rotary driving section 28 of the friction section 18, as indicated in FIG. 1 by means of the distance a in the radial direction 8, 10. In the first embodiment in accordance with FIG. 1, this distance a is greater than 0 mm, and the distance a should be chosen so that an internal retaining ring can be arranged on the plate carrier without difficulty without the possibility that the end plate 2 will be supported against the retaining ring and hence against the plate carrier in axial direction 6 via the reinforcing section 30. Support against the retaining ring may be exclusively via the friction section 18 and/or the rotary driving section 28.

In order to obtain a flat front side 20 of the friction section 18 which has a relatively large extent in the radial direction 8, 10, a bending radius b is formed at the transition between the front side 20 of the friction section 18 and the reinforcing section 30 or first section 32 thereof, said bending radius being no more than 1.0 mm, preferably no more than 0.8 mm, particularly preferably no more than 0.6 mm. The smaller the bending radius b selected, the further the flat front side 20 can extend in radial direction 10, ensuring that the front side 20 forms a particularly large friction surface or mounting surface for the friction facing 22.

FIG. 2 shows a second embodiment of the end plate 2 according to the invention, the second embodiment corresponding essentially to the first embodiment and therefore only the differences are explained below, the same reference signs are used for identical or similar components and the above description otherwise applies mutatis mutandis.

The second embodiment of the end plate 2 in accordance with FIG. 2 is once again an outer plate but the rotary driving section 28 is not formed by an external tooth system but instead is formed by a section in which a plurality of apertures 36 distributed in the circumferential direction 12, 14 and spaced apart are provided, said apertures being completely surrounded by the material of the end plate 2 in the embodiment illustrated, in contrast to the spaces between the teeth. It is thus possible for rotary driving fingers projecting in axial direction 6 on the plate carrier to be inserted in axial direction 6 into the apertures 36 in order to achieve a rotary driving connection between the plate carrier and the end plate 2. The end plate 2 can thus also be fixed in axial direction 6 on the associated plate carrier via a retaining ring situated radially on the outside, against which the rotary driving section 28 can be supported in axial direction 6. In this case, the distance a selected can be significantly smaller than that in the first embodiment, and can even be reduced to 0 mm, as shown in FIG. 2, especially as there is no danger in this embodiment that the reinforcing section 30 will strike against the retaining ring in axial direction 6, which would necessitate a greater overall axial length of the associated plate carrier.

FIG. 3 shows a third embodiment of the end plate 2 according to the invention, the third embodiment corresponding essentially to the first embodiment in accordance with FIG. 1, and therefore only the differences are explained below, the same reference signs are used for identical or similar components and the above description otherwise applies mutatis mutandis.

In the third embodiment in accordance with FIG. 3, the reinforcing section 30 comprises not only the first section 32 already described but also a second section 38, which integrally adjoins the first section 32 and is at least partially and preferably completely bent through an angle β in axial direction 6 relative to the first section 32. In the embodiment illustrated, the angle β is 180°, with the result that the second section 38 likewise extends parallel to the first section 32 in the radial direction 8, 10 and is thus also arranged parallel to the friction section 18. Moreover, the front side 40 of the second section 38, which faces in the axial direction 4, is at least partially and preferably completely supported in an areal manner against the front side 42 of the first section 32 of the reinforcing section 30, said front side facing in axial direction 6. Irrespective of whether the reinforcing section 30 has both sections 32, 38 or further sections, it continues to hold true that the reinforcing section 30 projects neither in radial direction 8 nor in radial direction 10 beyond the friction section 18 of the end plate 2.

FIG. 4 shows a fourth embodiment of the end plate 2 according to the invention, which corresponds essentially to the embodiment in accordance with FIG. 2, the reinforcing section 30 in this fourth embodiment too having a second section 38, as already described with reference to FIG. 3. For this reason, attention is merely drawn here to the description of FIGS. 3 and 2, which applies mutatis mutandis to the fourth embodiment in accordance with FIG. 4. It should merely be noted that the distance a in the radial direction 8, 10 between the rotary driving section 28 and the reinforcing section 30 can also be reduced to 0 mm, especially as the embodiment of the end plate 2 in accordance with FIG. 4 allows the use of an external retaining ring on the plate carrier.

The embodiments of the end plate 2 which are shown in FIGS. 5 to 8 correspond essentially to the embodiments in accordance with FIGS. 1 to 4, the essential difference being that the embodiments in accordance with FIGS. 5 to 8 are designed as inner plates, and the respective rotary driving section 28 therefore follows the friction section 18 integrally in radial direction 10, while the reinforcing section 30 adjoins the friction section 18 in radial direction 8. Reference can therefore be made at this point to the description of the embodiments in accordance with FIGS. 1 to 4, which applies mutatis mutandis to the embodiments in accordance with FIGS. 5 to 8. As regards the embodiments in accordance with FIGS. 5 and 7, in which the end plate 2 can be secured on the plate carrier by means of an external retaining ring, it should however be further mentioned that the distance a in the radial direction 8, 10 between the rotary driving section 28 and the reinforcing section 30 is chosen so that the reinforcing section 30 likewise represents a means of safeguarding said retaining ring against centrifugal force. This means that, in the case of these embodiments, the reinforcing section 30 or a section 32, 38 thereof should limit the expansion of the retaining ring under the action of centrifugal force since the retaining ring can be supported against the reinforcing section 30 in the event of expansion in radial direction 8. Here, the limit to the support for the retaining ring against the reinforcing section 30 in radial direction 8 should preferably be such that the retaining ring expanded under the action of centrifugal force does not lift completely out of a corresponding groove on the plate carrier.

FIG. 9 shows a ninth embodiment of the end plate 2 according to the invention, the embodiment illustrated being a development of the end plate described with reference to FIG. 2. The end plate 2 in accordance with FIG. 9 is accordingly a one-piece combination of the end plates in accordance with FIGS. 2 and 6. It is therefore only the distinguishing features which are described below and the same reference numerals are used for identical or similar components, while otherwise the above description of the embodiment in accordance with FIG. 2 applies mutatis mutandis.

The end plate 2 in accordance with FIG. 9 furthermore has a second friction section 44, which integrally adjoins the rotary driving section 28 in radial direction 8 and extends in the radial direction 8, 10, to form a second flat front side 46, which can be turned toward a second plate assembly in axial direction 4. The second front side 46 too is arranged in a plane generated by the radial directions 8, 10, and the axis of rotation 16 of the end plate 2 again forms the surface normal of this plane. The second front side 46 also has secured on it a second friction facing 48, which forms a second friction surface 50 of the end plate 2 facing in axial direction 4. In addition, the end plate 2 has a second reinforcing section 52, which integrally adjoins the second friction section 44 in radial direction 8 and which can once again be made up of a first section 54 and further sections 56.

The second reinforcing section 52 or the first section 54 of the second reinforcing section 52, the section adjoining the second friction section 44, is also at least partially and preferably completely bent through an angle α in axial direction 6 relative to the second friction section 44, and once again this angle α is greater than 90°, preferably at least 135°, particularly preferably at least 180°. Otherwise, reference should be made to the above description, which applies mutatis mutandis, with the same reference signs once again being used for identical or similar components.

However, the following should be noted about such an end plate 2, which serves both as an end plate for a first plate assembly and as an end plate for a second plate assembly. If the end plate 2 is fixed on the plate carrier in axial direction 6 by means of a retaining ring situated radially on the inside, the distance a between the rotary driving section 28 and the first reinforcing section 30 should be greater than 0 mm, making it easy to insert the retaining ring and ensuring that support in axial direction 6 is provided exclusively via the first friction section and/or the rotary driving section 28. However, the distance a between the second reinforcing section 52 and the rotary driving section 28 can be smaller, and can be 0 mm at the least. In the reverse case, on the other hand, i.e. when the dual-function end plate 2 is supported in axial direction 6 against the first plate carrier by means of a retaining ring situated radially on the outside, the distance a between the second reinforcing section 52 and the rotary driving section 28 should be greater than 0 mm, while the distance a between the first reinforcing section 30 and the rotary driving section 28 can be made smaller, e.g. 0 mm. In the latter case, it is once again advantageous if the second reinforcing section 52 likewise acts as a centrifugal force safeguard for the external retaining ring. The second alternative mentioned is furthermore indicated by means of dashed lines in FIG. 9.

The tenth embodiment of the end plate 2 in accordance with FIG. 10 corresponds essentially to the embodiment in accordance with FIG. 9 although both reinforcing sections 30, 52 once again have a second section 38, 56 in addition to the first section 32, 54. As regards the bending and design of the second section 38, 56, reference should once again be made to the above description, which applies mutatis mutandis.

FIG. 11 shows a first embodiment of the multiplate clutch 58 according to the invention, which is preferably a wet multi-unit multiplate clutch. Even though the following embodiments relate exclusively to multiplate clutches 58, the description applies mutatis mutandis to other frictionally operating devices, such as multidisk brakes or the like. In FIG. 11, the axis of rotation 60 of the multiplate clutch 58 is indicated by a dashed line, and the axis of rotation 60 corresponds to the axis of rotation 16 of the end plate 2 used. Similar statements apply to the axial directions 4, 6, the radial directions 8, 10 and the circumferential directions 12, 14 of the multiplate clutch 58.

The multiplate clutch 58 has a first plate carrier 62 and a second plate carrier 64. In the embodiment shown in FIG. 11, the first plate carrier 62 is designed as an outer plate carrier, while the second plate carrier 64 is designed as an inner plate carrier. Arranged between the two plate carriers 62, 64, in the radial direction 8, 10, is a plate assembly, which is made up of a first plate set comprising the plates 66 and the end plate 2, and a second plate set comprising the plates 68. While the plates 66 of the first plate set and the end plate 2 are connected in a torsionally rigid manner to the first plate carrier 62, the plates 68 of the second plate set are connected in a torsionally rigid manner to the second plate carrier 64. The plates 66, 68 of the two plate sets are arranged alternately in series in axial direction 4, 6 and can be pressed together in axial direction 4, 6 with the aid of an axially displaceable actuating element 70, which can be a hydraulically drivable actuating piston for example, giving rise to a frictional engagement between the plates 66, 68 which allows torque transmission between the first and second plate carrier 62, 64. Arranged between the actuating element 70 and the first plate 66 in axial direction 4 of the first plate set there is furthermore a pressure plate 72, which is likewise connected in a torsionally rigid manner to the first plate carrier 62.

The end plate 2 can be supported against the first plate carrier 62 in axial direction 6 by means of a retaining ring 74 to enable a counter force opposed to the actuating element 70 to be supplied and to enable the entire plate assembly to be supported in axial direction 6. In this embodiment, the end plate 2 which is arranged on that side of the plate assembly which faces away from the area of force introduction is of like construction to the end plate 2 in accordance with FIG. 1. In the installed condition, the front side 20 of the friction section 18 or friction surface 24 of the friction facing 22 secured on the front side 20 faces the plate assembly, allowing the friction facing 22 of the end plate 2 to be brought directly into frictional engagement with the adjacent plate 68 of the second plate set when the plate assembly is pressed together in axial direction 4, 6 with the aid of the actuating element 70.

As already indicated above, the end plate 2 in accordance with FIG. 1 is supported against the first plate carrier 62 in axial direction 6 with the aid of an internal retaining ring 74. Here, support is provided exclusively via the rotary driving section 28 in the form of the external tooth system and, if appropriate, additionally via the friction section 18 of the end plate 2. The distance a between the reinforcing section 30 and the rotary driving section 28, on the other hand, is chosen so that the retaining ring 74 does not provide any direct axial support for the reinforcing section 30 against the first plate carrier 62. Moreover, said distance a should be chosen so that the retaining ring 74 can be inserted easily into the internal groove 76 of the first plate carrier 62.

The second embodiment of the multiplate clutch 58 according to the invention, which is shown in FIG. 12, corresponds essentially to the first embodiment in accordance with FIG. 11, and therefore only the differences are explained below, the same reference signs are used for identical or similar components and the above description otherwise applies mutatis mutandis.

In the second embodiment in accordance with FIG. 12, the end plate 2 in accordance with FIG. 2 is used. Here, the retaining ring 74 is designed as an external retaining ring, which is inserted into an external groove 76 in the first plate carrier 62. The first plate carrier 62 furthermore has rotary driving fingers 78 projecting in axial direction 6, which extend through the apertures 36 in the rotary driving section 28 in order to achieve a rotary driving connection between the first plate carrier 62 and the end plate 2. By virtue of the external retaining ring 74, the end plate 2 is supported against the first plate carrier 62 in axial direction 6 exclusively via the rotary driving section 28 of said end plate, enabling the distance a between the rotary driving section 28 and the reinforcing section 30 to be made smaller than is the case with the previous embodiment described. Thus the distance a can be 0 mm, for example, thereby making it possible to achieve a particularly high rigidity of the end plate 2 in axial direction 4, 6.

The third embodiment of the multiplate clutch 58 according to the invention, which is shown in FIG. 13, corresponds essentially to the embodiment in accordance with FIG. 11, the first plate carrier 62 in this case being designed as an inner plate carrier, while the second plate carrier 64 is designed as an outer plate carrier. To this extent, only the differences will be explained below and otherwise the above description applies mutatis mutandis.

In the third embodiment of the multiplate clutch 58 according to the invention in accordance with FIG. 13, the end plate 2 shown in FIG. 5 is used. Here, the end plate 2 is once again supported against the first plate carrier 62 in axial direction 6 with the aid of an external retaining ring 74, the external retaining ring 74 being arranged in an external groove 76 in the first plate carrier 62. In this embodiment too, the distance a in the radial direction 8, 10 between the reinforcing section 30 and the rotary driving section 28 is designed so that the end plate 2 is supported in axial direction 6 against the retaining ring 74 via the rotary driving section 28 and, where applicable, the friction section 18 and hence against the first plate carrier 62, while there is no direct axial support for the reinforcing section 30 of the end plate 2 against the retaining ring 74. However, the distance a is chosen so that the reinforcing section 30 acts as a centrifugal force safeguard for the external retaining ring 74 if the latter expands in radial direction 8 under the action of centrifugal force. This means that when the retaining ring 74 expands in radial direction 8 under the action of centrifugal force, it is supported against the reinforcing section 30 before it is lifted completely out of the external groove 76 in radial direction 8. In order to ensure that the retaining ring 74 is easy to fit nevertheless, the illustrated multiplate clutch 58 should have an appropriate release clearance to enable the end plate 2 to be pushed sufficiently far in axial direction 4 to enable the retaining ring 74 to be inserted without difficulty into the groove 76 in axial direction 4 and radial direction 10.

The fourth embodiment of the multiplate clutch 58 according to the invention, which is shown in FIG. 14, corresponds essentially to the embodiment in accordance with FIG. 13, and therefore essentially the above description applies mutatis mutandis. The only difference is that, in the embodiment in accordance with FIG. 14, the end plate 2 in accordance with FIG. 6 is used, enabling an internal retaining ring 74 in an internal groove 76 to be used to support the end plate 2 against the first plate carrier 62 in axial direction 6. As already mentioned above, this makes it possible to significantly reduce the distance a in comparison with the embodiment in accordance with FIG. 13, and, in this case too, the first plate carrier 62 has axially projecting rotary driving fingers 78 which extend into the apertures 36 in the rotary driving section 28 in axial direction 6 in order to effect a rotary driving connection between the end plate 2 and the first plate carrier 62. In the embodiment in accordance with FIG. 14 too, direct support for the end plate 2 against the retaining ring 74 in axial direction 6 is once again provided exclusively via the rotary driving section 28 but not via the reinforcing section 30.

Taking the multiplate clutch 58 in accordance with FIG. 11 as a basis, FIG. 15 shows a fifth embodiment of the multiplate clutch 58 according to the invention. In the fifth embodiment, the first plate carrier 62 is designed not only as an outer plate carrier for the plates 66 of the first plate set but also as an inner plate carrier for the plates 80 of a third plate set. The third plate set comprising the plates 80 is part of a second plate assembly, which is assigned a second pressure plate 82 and a second actuating element 84 for pressing the second plate assembly together, the second plate assembly being arranged between a third plate carrier 86, designed as an outer plate carrier, and the first plate carrier 62, which is additionally designed as an inner plate carrier, in the radial direction 8, 10. Here, the plates 80 of the third plate set together with the second pressure plate 82 are connected in a torsionally rigid manner to the first plate carrier 62, while the plates 88 of a fourth plate set, which belongs to the second plate assembly, are connected in a torsionally rigid manner to the third plate carrier 86. In the case of the illustrated multiplate clutch 58, it is therefore also possible to speak of a dual clutch. The plates 80, 88 of the third and fourth plate set are once again arranged alternately in series in axial direction 4, 6 and can be brought into frictional engagement with one another by pressing the second plate assembly together with the aid of the second actuating element 84.

In the fifth embodiment in accordance with FIG. 15, the end plate 2 which has already been described with reference to FIG. 9 is used. The end plate 2 thus forms both an end plate of the first plate set, comprising the plates 66, and an end plate of the third plate set, comprising the plates 80. When the first plate assembly is actuated, the friction surface 24 of the first friction facing 22 can thus be brought directly into frictional engagement with the adjacent plate 68 of the second plate set, while the second friction surface 50 of the second friction facing 48 can be brought directly into frictional engagement with the adjacent plate 88 of the fourth plate set by pressing the second plate assembly together with the aid of the second actuating element 84. As already indicated above, the rotary driving connection between the first plate carrier 62 and the end plate 2 is achieved by virtue of the fact that axially projecting rotary driving fingers 78 extend into the apertures 36 in the rotary driving section 28 of the end plate 2 in axial direction 6. Once again, support for the end plate 2 against the first plate carrier 62 in axial direction 6 is provided with the aid of an internal retaining ring 74, which rests in an internal groove 76 in the first plate carrier 62. As regards the dimensioning of the distances a between the two reinforcing sections 30, 52 and the rotary driving section 28 of the end plate 2, reference should be made to the above explanations.

The sixth embodiment of the multiplate clutch 58 according to the invention, which is shown in FIG. 16, corresponds essentially to the embodiment in accordance with FIG. 15, with an external retaining ring 74 on the first plate carrier 62 being used in the sixth embodiment, with the result that the second reinforcing section 52 of the end plate 2 likewise acts as a centrifugal force safeguard for the retaining ring 74, as already explained above.

Although not illustrated in FIG. 11, the end plate 2 as per FIG. 3 can likewise be used in a multiplate clutch 58 in accordance with FIG. 11. A similar statement applies to the combination of the end plate 2 in accordance with FIG. 4 with a multiplate clutch 58 in accordance with FIG. 12, the combination of the end plate 2 in accordance with FIG. 7 with the multiplate clutch 58 in accordance with FIG. 13, the combination of the end plate 2 in accordance with FIG. 8 with the multiplate clutch 58 in accordance with FIG. 15, and the combination of the end plate 2 in accordance with FIG. 10 with one of the multiplate clutches 58 of FIGS. 15 and 16.

Even though, in FIGS. 11 to 16, the plates 66 and 80 of the first and third plate sets are shown as plates provided with a friction facing on both sides while the plates 68 and 88 of the second and fourth plate sets are designed as steel plates, the invention is not restricted thereto. On the contrary, it is likewise possible to design plates 66, 80 and plates 68, 88 as plates provided with a friction facing on one side. In this case, it would be necessary for either the end plate 2 or the pressure plate 72 or 82 likewise to be provided with a friction facing on one side, depending on the side chosen for the friction facing. It is also likewise possible to design plates 66 and 80 as steel plates, while providing plates 68 and 88 with a friction facing on both sides.

An embodiment of the method for the production of the end plate 2 in accordance with FIG. 1 will be explained below by way of example with reference to FIGS. 17 to 22.

Figure 17:
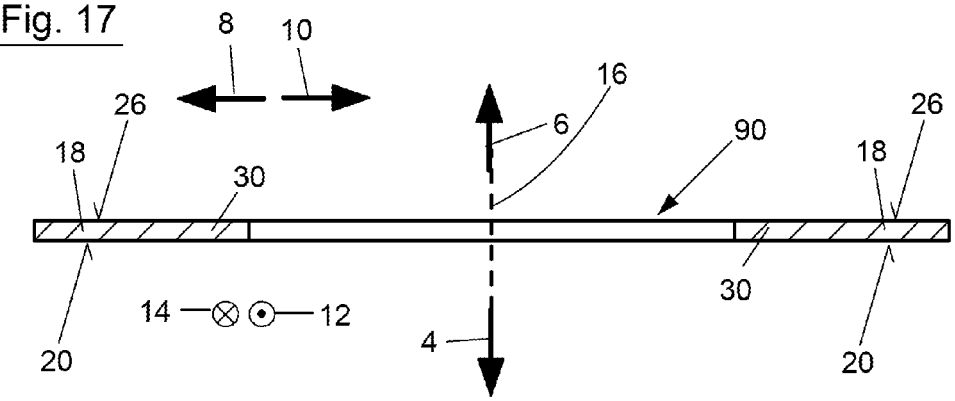

As can be seen from FIG. 17, a one-piece, flat annular disk 90 is first of all prepared. This disk has a reinforcing section 30, situated on the inside in radial direction 10, and a friction section 18, situated on the outside in radial direction 8, although said sections 30, 18 are initially only notionally separated from one another in the annular disk 90 illustrated. At all events, the friction section 18 and the reinforcing section 30 are constructed in one piece with one another.

Figure 18:
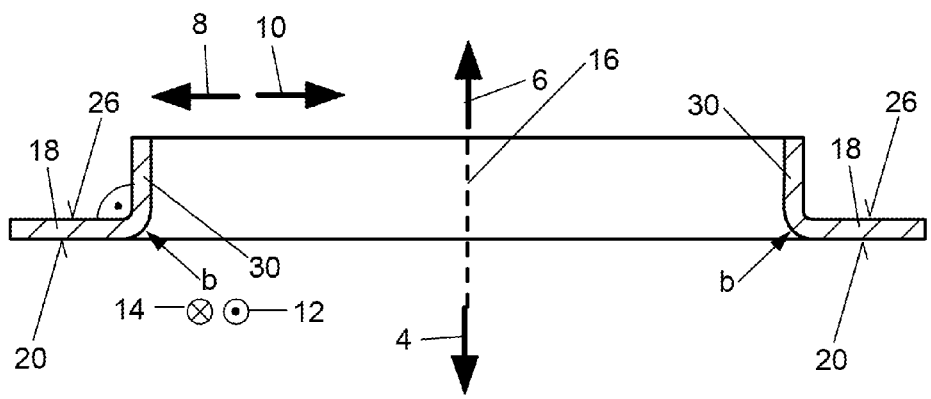

The reinforcing section 30 is then bent through 90° relative to the friction section 18, as shown in FIG. 18. This bending is preferably accomplished by deep drawing. As can be seen from FIG. 18, the reinforcing section 30 now forms a substantially tubular body. A relatively large bending radius b is formed by the bending or deep drawing of the reinforcing section 30 at the transition between the front side 20 of the friction section 18, which faces away from the reinforcing section 30, and the reinforcing section 30, which is bent through 90° relative to the friction section 18.

Figure 19:
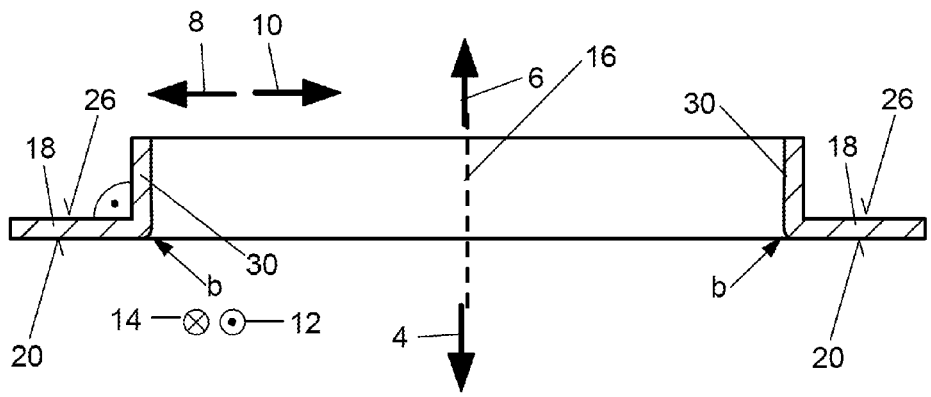

In order to obtain a flat front side 20 of the friction section 18 which has as large an area as possible, the bending radius b is reduced in a further method step, the result of which can be seen in FIG. 19, the resulting bending radius preferably being no more than 1.0 mm, particularly preferably no more than 0.8 mm or 0.6 mm. This reduction in the bending radius b is preferably accomplished by counternecking.

Figure 20:
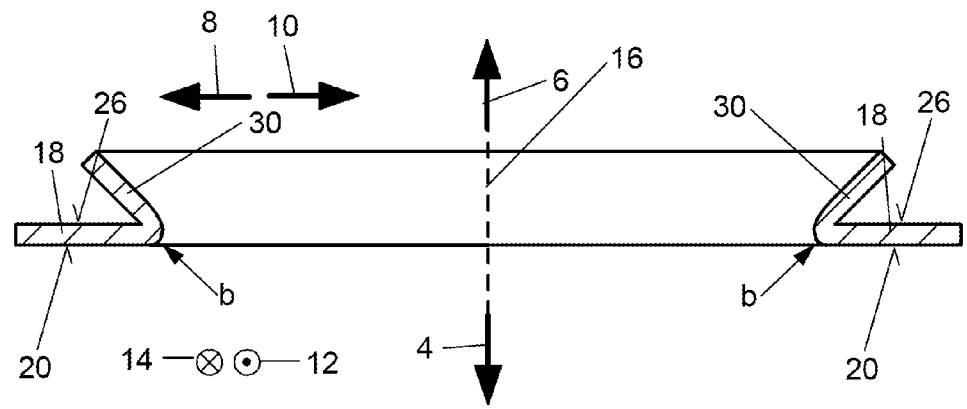

In a further method step, the result of which can be seen in FIG. 20, the reinforcing section 30, which has already been bent through 90° relative to the friction section 18, is bent or widened further in such a way that it is bent through more than 90°, at least 135° or at least 180°, relative to the friction section 18. This further bending or widening can be accomplished with the aid of a correspondingly shaped punch, for example. It is also possible for the bending or widening to be carried out in such a way, even in this method step, that the reinforcing section 30 is supported against the rear side 26 of the friction section 18, which faces away from the front side 20. In the case of the embodiment illustrated, however, the intention is that this should be carried out only in the method step described below.

Figure 21:
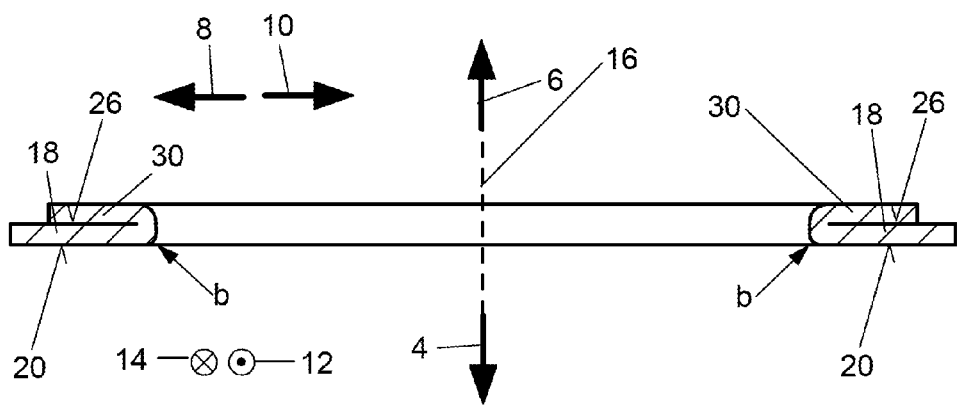

In the abovementioned further method step, the result of which can be seen in FIG. 21, the reinforcing section 30 is stamped or pressed together with the friction section 18 in axial direction 4, 6, and this is preferably carried out in such a way that the reinforcing section 30 is supported against the rear side 26 of the friction section 18. As already described above with reference to the end plate 2 according to the invention, this support should preferably be provided areally, and particularly preferably there should be complete support.

In a further preceding or following method step, the front side 20 of the friction section 18 is finish-machined, thereby increasing the flatness of the front side 20. The finish-machining to increase the flatness of the front side 20 is preferably accomplished by grinding, particularly preferably by belt grinding.

Figure 22:
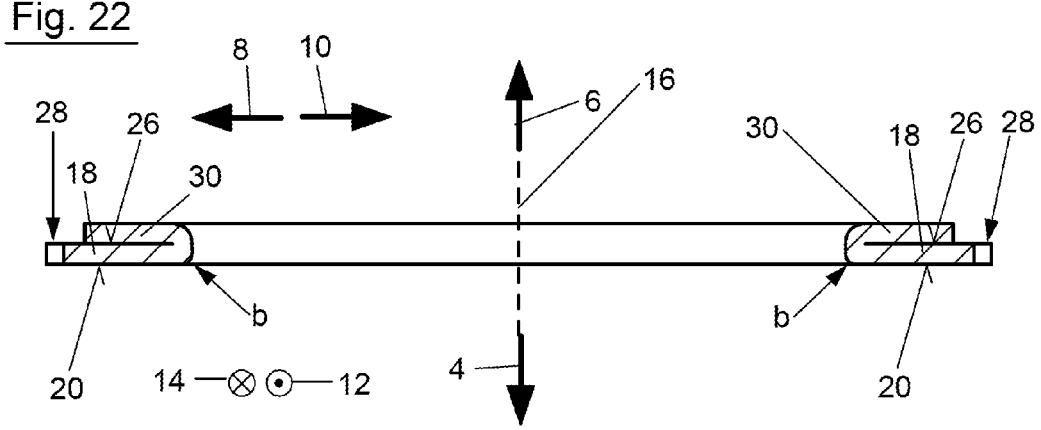

In a further method step, the result of which can be seen in FIG. 22, a rotary driving section 28 is produced on the rim of the friction section 18, said rim facing outward in radial direction 8, the rotary driving section 28 preferably being produced by punching.

List of Reference Signs

2 end plate
4 axial direction
6 axial direction
8 radial direction
10 radial direction
12 circumferential direction
14 circumferential direction
16 axis of rotation
18 friction section
20 front side
22 friction facing
24 friction surface
26 rear side
28 rotary driving section
30 reinforcing section
32 first section
34 rear side
36 apertures
38 second section
40 front side
42 front side
44 second friction section
46 second front side
48 second friction facing
50 second friction surface
52 second reinforcing section
54 first section
56 second section
58 multiplate clutch
60 axis of rotation
62 first plate carrier
64 second plate carrier
66 plates
68 plates
70 actuating element
72 pressure plate
74 retaining ring
76 groove
78 rotary driving finger
80 plates
82 second pressure plate
84 second actuating element
86 third plate carrier
88 plates
90 annular disk
α angle
β angle
a distance
b bending radius

The invention claimed is:

1. An annular end plate for a plate assembly of a frictionally operating device, comprising: a friction section extending in a first radial direction to form a flat front side, which faces the plate assembly in a first axial direction; a rotary driving section, which integrally adjoins the friction section in the first radial direction; a reinforcing section or a first section which integrally adjoins the friction section in the opposite, second, radial direction, being at least partially or completely bent through more than 90° in the opposite, second, axial direction relative to the friction section.

2. The end plate as set forth in claim 1 wherein the reinforcing section or the first section is at least partially or completely bent through at least 135° to 180°, relative to the friction section.

3. The end plate as set forth in claim 1 wherein the reinforcing section or the first section is bent in such a way that the reinforcing section or the first section is supported against the rear side of the friction section, said rear side facing away from the front side, the reinforcing section or the first section extending parallel to the friction section in the radial direction.

4. The end plate as set forth in claim 1 wherein the reinforcing section furthermore has a second section, which integrally adjoins the first section and is at least partially bent in the second axial direction relative to the first section, the second section being supported against that side of the first section which faces away from the friction section.

5. The end plate as set forth in claim 1 wherein the reinforcing section is bent in such a way that it does not project in either the first radial direction or in the second radial direction beyond the friction section.

6. The end plate as set forth in claim 1 wherein the reinforcing section does not have a rotary driving section, the distance (a) in the radial direction between the reinforcing section and the rotary driving section adjoining the friction section.

7. The end plate as set forth in claim 1 wherein the end plate friction section is an un-faced steel plate or is a friction-faced steel plate with a friction facing arranged on the front side.

8. The end plate as set forth in claim 1 wherein the end plate has a second friction section which integrally adjoins the rotary driving section in the first radial direction and extends in the radial direction to form a second front side, which can be turned toward a second plate assembly in the first axial direction and has a second reinforcing section which integrally adjoins the second friction section in the first radial direction, the second reinforcing section or the first section of the second reinforcing section, that adjoining the second friction section, being at least partially bent through more than 90° in the second axial direction relative to the second friction section, the rotary driving section having a multiplicity of circumferentially distributed apertures.

9. The end plate as set forth in claim 1, further comprising a transition between the front side of the friction section and the reinforcing section, wherein a bending radius (b) is formed at the transition between the front side of the friction section and the reinforcing section, said bending radius being no more than 1.0 mm.

10. A frictionally operating device comprising a multiplate clutch or multi-unit multiplate clutch having a plate assembly comprising a first plate set, which is connected in a torsionally rigid manner to a first plate carrier, and a second plate set, which is connected in a torsionally rigid manner to a second plate carrier, the plates of the two plate sets being arranged alternately in series in the axial direction and being capable of being brought into frictional engagement, and the first plate set having an end plate which is supported against the first plate carrier in the second axial direction by means of a retaining ring, by means of a retaining ring situated radially on the inside, the end plate is an end plate as claimed in one of claims 1 to 9, comprising a friction section extending in a first radial direction to form a flat front side or a friction facing of the end plate of the first plate set capable of being brought directly into frictional engagement with the adjacent plate of the second plate set.

11. The frictionally operating device as set forth in claim 10 comprising a second plate assembly comprising a third plate set, which is connected in a torsionally rigid manner to the first plate carrier, and a fourth plate set, which is connected in a torsionally rigid manner to a third plate carrier, the plates of the third and fourth plate sets being arranged alternately in series in the axial direction and being capable of being brought into frictional engagement with one another, and the end plate connected to the first plate carrier of the first plate set furthermore forming the end plate of the third plate set, thus allowing the second front side, the end plate further comprising a rotary driving section and apertures formed therein, the first plate carrier having axially projecting rotary driving fingers which extend into the apertures in the rotary driving section of the end plate.

12. A method for the production of an end plate as set forth in claim 1 comprising:
    providing a one-piece, flat annular disk having a friction section and a reinforcing section situated radially on the inside or on the outside, and
    bending of the reinforcing section in an axial direction in such a way that said reinforcing section is bent through more than 90° relative to the friction section.

13. The method as set forth in claim 12, wherein the bending the reinforcing section comprise:
    bending the reinforcing section in such a way that it is bent through 90° relative to the friction section,
    reducing the bending radius (b) at the transition between the front side of the friction section, which faces away from the reinforcing section, and the reinforcing section, which is bent through 90° relative to the friction section, and
    bending the reinforcing section, which has been bent through 90° relative to the friction section in such a way that said reinforcing section is bent through more than 90° relative to the friction section.

14. The method as set forth in claim 12 further comprising:
    stamping or pressing the friction section together with the reinforcing section in the axial direction in such a way that the reinforcing section is supported against the rear side of the friction section.

15. The method as set forth in claim 12 further comprising:
    finish-machining of the front side of the friction section, thereby increasing the flatness of the front side by grinding, or producing a rotary driving section on the friction section by punching.

* * * * *